United States Patent
Kuroda et al.

(10) Patent No.: US 10,201,776 B2
(45) Date of Patent: *Feb. 12, 2019

(54) ABSORPTION TYPE REMOVAL / CONCENTRATION APPARATUS

(71) Applicant: SEIBU GIKEN CO., LTD., Fukuoka (JP)

(72) Inventors: Ayako Kuroda, Fukuoka (JP); Koji Inoue, Fukuoka (JP); Hiroshi Okano, Fukuoka (JP)

(73) Assignee: SEIBU GIKEN CO., LTD., Fukuoka (JP)

( * ) Notice: Subject to any disclaimer, the term of this patent is extended or adjusted under 35 U.S.C. 154(b) by 135 days.

This patent is subject to a terminal disclaimer.

(21) Appl. No.: 15/446,265

(22) Filed: Mar. 1, 2017

(65) Prior Publication Data
US 2017/0252693 A1    Sep. 7, 2017

(30) Foreign Application Priority Data

Mar. 1, 2016 (JP) .................. 2016-038709

(51) Int. Cl.
*B01D 53/06* (2006.01)
*F24F 3/00* (2006.01)
(Continued)

(52) U.S. Cl.
CPC .............. *B01D 53/06* (2013.01); *F24F 3/001* (2013.01); *F24F 3/14* (2013.01); *F24F 3/1603* (2013.01);
(Continued)

(58) Field of Classification Search
CPC .............. B01D 53/06; B01D 2253/102; B01D 2253/106; B01D 2253/206;
(Continued)

(56) References Cited

U.S. PATENT DOCUMENTS

| 5,061,455 A | * | 10/1991 | Brose ..................... B01D 53/04 423/228 |
| 8,500,854 B1 | * | 8/2013 | Pennline ............ B01D 53/0462 95/117 |

(Continued)

FOREIGN PATENT DOCUMENTS

JP     5795423     10/2015

OTHER PUBLICATIONS

"Earth Carbon Dioxide-Management-Technique", <http://www.meti.go.jp/meti_lib/report/2012fy/E002155.pdf#search='RITE+%E5%9B%BA%E4%BD%93%E3%82%A2%E3%83%9F%E3%83%B3+%E6%88%90%E6%9E%9C%E5%A0%B1%E5%91%8A%E6%9B%B8+%E5%B9%B3%E6%88%9022%E5%B9%B4>.

*Primary Examiner* — Frank M Lawrence, Jr.
(74) *Attorney, Agent, or Firm* — Staas & Halsey LLP

(57) ABSTRACT

An absorption type carbon dioxide removal/concentration apparatus has a honeycomb rotor which holds an amine support solid absorbent. The honeycomb rotor is divided into at least a processing zone and a reproduction zone. An enthalpy (temperature and humidity) adjustment device is provided for the air for reproduction and/or the air to be processed. The apparatus can control the carbon dioxide absorbing performance and the concentration performance by passing processing and reproduction air through the corresponding zones. The absorption type carbon dioxide removal/concentration apparatus can remove or condense carbon dioxide, can secure high recovery efficiency and can prevent a thermal deterioration of the amine absorbent to extend the life-span of the apparatus.

19 Claims, 9 Drawing Sheets

(51) Int. Cl.
*F24F 3/14* (2006.01)
*F24F 3/16* (2006.01)
*F24F 12/00* (2006.01)
*F24F 13/22* (2006.01)

(52) U.S. Cl.
CPC ........ *F24F 12/00* (2013.01); *B01D 2253/102* (2013.01); *B01D 2253/106* (2013.01); *B01D 2253/206* (2013.01); *B01D 2253/25* (2013.01); *B01D 2253/3425* (2013.01); *B01D 2257/504* (2013.01); *B01D 2257/708* (2013.01); *B01D 2259/4009* (2013.01); *B01D 2259/4508* (2013.01); *F24F 2003/1621* (2013.01); *F24F 2013/225* (2013.01); *F24F 2203/1024* (2013.01); *F24F 2203/1048* (2013.01); *Y02A 50/235* (2018.01); *Y02C 10/06* (2013.01); *Y02C 10/08* (2013.01); *Y02P 60/24* (2015.11)

(58) Field of Classification Search
CPC ........ B01D 2253/25; B01D 2253/3425; B01D 2257/504; B01D 2257/708; B01D 2259/4009; B01D 2259/4508; F24F 3/001; F24F 3/14; F24F 3/1603; F24F 2003/1621; F24F 12/00; F24F 2013/225; F24F 2203/1024; F24F 2203/1048; Y02A 50/235; Y02C 10/06; Y02C 10/08; Y02P 60/24

USPC .......... 96/121, 125, 126, 144, 154; 423/230; 95/139

See application file for complete search history.

(56) References Cited

U.S. PATENT DOCUMENTS

| | | | | |
|---|---|---|---|---|
| 8,840,704 | B2* | 9/2014 | Shoji | B01D 53/025 95/115 |
| 8,951,490 | B2* | 2/2015 | Okumura | B01D 53/04 422/168 |
| 9,908,083 | B2* | 3/2018 | Maruyama | B01D 53/62 |
| 2002/0083833 | A1* | 7/2002 | Nalette | A62B 11/00 95/139 |
| 2007/0169624 | A1* | 7/2007 | Saito | B01D 53/02 95/139 |
| 2011/0289955 | A1* | 12/2011 | Okano | F24F 3/1423 62/271 |
| 2012/0000365 | A1* | 1/2012 | Okano | B01D 53/06 96/144 |
| 2012/0204718 | A1* | 8/2012 | Dinnage | B01D 53/06 95/91 |
| 2014/0298996 | A1* | 10/2014 | Meirav | B01D 53/04 96/154 |
| 2015/0375161 | A1* | 12/2015 | Boulet | F23C 9/08 95/96 |
| 2016/0175772 | A1 | 6/2016 | Maruyama et al. | |

* cited by examiner

ABSORPTION TYPE REMOVAL / CONCENTRATION APPARATUS

CROSS-REFERENCE TO RELATED APPLICATIONS

This application is based upon and claims the benefit of priority from the prior Japanese Patent Application No. 2016-38709, filed on Mar. 1, 2016, the entire contents of which are incorporated herein by reference.

BACKGROUND

The present invention relates to the absorption type-removal/concentration apparatus which can remove and condense carbon dioxide by separating carbon dioxide contained in air to be processed from the air to be processed by making use of a difference in enthalpy between air to be processed and air to be reproduced.

Conventionally, as to the apparatus which can separate and remove a gaseous material to be removed from air to be processed in a concentrated state and at low temperature, for example, as disclosed in Japanese Patent Publication No. 5795423, the absorption type removal/concentration apparatus which can secure a material recovery rate of the apparatus by humidifying the low-temperature reproduced air using a breathable adsorption rotor which holds an amine support solid absorbent while suppressing a renewable energy is well-known.

Currently, the chemicals absorbing method by amine solution is known as one of the separation and collection technologies of carbon dioxide. Since immense energy is required in order that amine solution may separate carbon dioxide from the amine solution which absorbed carbon dioxide (the amine solution is heated to reproduce), reduction of renewal energy is desired. As one of solutions, development of a solid absorbent is progressing. Using the solid absorbent can reduce the excessive energy about required heating and cooling of moisture, which is necessary to be a solution system at the time of reproduction of amine solution.

As disclosed in Public utility foundation legal entity, Research Institute of Innovative Technology for the Earth, "Carbon dioxide collection-management-technique highly advanced enterprise Result report" (2010), the absorption process of the carbon dioxide using amine solution is indicated generally by the following formulas.

Primary Amine (R—$NH_2$)

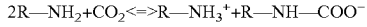 [1]

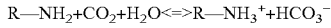 [2a]

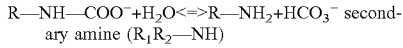 secondary amine ($R_1R_2$—NH) [2b]

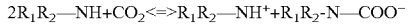 [3]

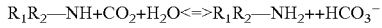 [4a]

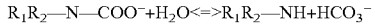 [4b]

If carbon dioxide absorption liquid can perform carbon dioxide absorption by the second indicated processes of [2a], [2b], [4a] and [4b], since heat of reaction becomes small rather than that of the reaction indicated by the process of [1] or [3], there is a merit that energy of desorption reproduction can be lessened. That is, in a case where an amine support solid absorbent is used, for example, the reactions will occur as indicated by the processes of [2a], [2b], [4a], and [4b] under the low-temperature condition that 15° C. of absorption Centigrade (let all temperature be "Centigrade" henceforth) and 45° C. of desorption are set. However, since these reactions progress under the condition of existence of water, coexistence of moisture (hygroscopic moisture) is indispensable.

Since the third class amine does not have NH combination, the reaction indicated above does not occur and the amine does not perform the absorption desorption of carbon dioxide under the low-temperature conditions, for example, such as 15° C. of absorption and 45° C. of desorption.

Also, in view of that an amine system carbon dioxide absorbent has problems of smell by oxidative decomposition and heat deterioration, it is important to make reproduction temperature low in order to reduce the smell and the deterioration.

SUMMARY

Additional aspects and/or advantages will be set forth in part in the description which follows and, in part, will be apparent from the description, or may be learned by practice of the invention.

The technology disclosed in Japanese Patent Publication No. 5795423 utilizes the honeycomb rotor holding an absorbent which needs coexistence of moisture as an amine support solid absorbent and enhances carbon dioxide removal performance while lowering the temperature of the air for reproduction by humidifying the air for reproduction in a reproduction zone. Also, the technology reduces the problems of degradation of an amine system carbon dioxide absorbent and of the smell by reproducing at low temperature.

However, as to the technology disclosed in Japanese Patent Publication No. 5795423, since it is unclear how the material recovery rate q of the carbon dioxide absorption type removal/concentration apparatus (namely, efficiency of separation removal of the material to be removed from the air to be processed in a processing zone) and the quality of the material to be removed are changed as a result, the optimization of the removal/concentration apparatus cannot be performed in a case that various specifications such as a design condition and air conditions are changed.

In view of the circumstances, the main subject the inventors' proposals is to provide the carbon dioxide absorption type removal/concentration apparatus which can control the amount of removal of the quality of the material to be removed of the apparatus by controlling the enthalpy of the air for reproduction (both temperature and humidity) and the enthalpy of the air to be processed (both temperature and humidity) by using the absorbent of carbon dioxide as an amine support solid absorbent. Also, the main subject of the inventors' proposals is to provide the carbon dioxide absorption type removal/concentration apparatus which can prevent degradation of an amine system carbon dioxide absorbent.

In view of the above, the inventors propose a carbon dioxide absorption type removal/concentration apparatus. The apparatus has a rotor which holds an absorbent of carbon dioxide. The rotor is divided into at least a processing zone and a reproduction zone. The air to be processed is ventilated to the processing zone, and thereby the carbon dioxide contained in the air to be processed is absorbed by a holding absorbent of the rotor portion to be separated and removed from the air to be processed. In the reproduction zone, the air to be reproduced is ventilated to the reproduction zone, and thereby the carbon dioxide which is absorbed by the holding absorbent of the rotor portion in the processing zone is separated and is removed to reproduce the absorbent of the rotor portion. As to the removal/concentration apparatus, an enthalpy adjustment device is mounted on the reproduction zone and/or the processing zone, and the adjustment device can adjust a difference in the enthalpy between the air to be reproduced and the air to be processed.

The desorption performance of the absorbent can be exerted in the reproduction zone by making the enthalpy of the air to be processed lower than that of the air to be reproduced by using an absorbent for carbon dioxide as an amine support solid absorbent, and the demonstrating absorption performance of carbon dioxide of the absorbent can be exerted in the processing zone by making the enthalpy of the air to be reproduced larger than that of the air to be processed. Thus, by utilizing a principle for performing absorption and desorption of an object by the difference in enthalpy (hereinafter, it is called "enthalpy swing absorption" or "ESA" (Enthalpy Swing Absorption)), the removal/concentration performance can be controlled in the absorption type removal/concentration apparatus.

As the enthalpy adjustment device, a combination of a temperature control device and a humidity adjustment device is used. However, depending on condition, the one of the above devices is used. As the temperature control device, a cooling coil, a heating coil, a peltier element, an electric heater, a condensation machine (condenser) of a steamy heater or heat pump, an evaporator, etc. are used. Also, as a humidity adjustment device, a method of a condensation removal of the moisture in the air is carried out by cooling with the cooling coil, an evaporator of heat pump, etc., and, if necessary, a method of humidifying to the target humidity with a humidifying device, etc. is used.

As the humidifying device, various methods such as a water heating type, an evaporation type, a water spray type and an ultrasonic type are used, and flocculated water generated by an evaporator of heat pump may be used. When humidity adjustment by this humidifying device is not required, the enthalpy adjustment is performed only by condensation removal of moisture by a cooling coil, etc.

As to moisture and heat desorbed in the reproduction zone, the recovery and supply of the moisture and the temperature can be carried out by the above devices in combination with a reproduction circulatory route and a total heat exchanger, etc. at an inlet of the reproduction zone.

In order to improve a carbon dioxide extraction ratio in the processing zone, a processing circulatory route constructed to return a part or the whole quantity of air which comes out of the processing zone to an inlet side of the processing zone may be provided.

The proposed absorption type removal/concentration apparatus is constituted as the above-stated. The carbon dioxide contained in the air to be processed is made to be absorbed in a holding absorbent of the rotor portion by ventilating the air to be processed into the processing zone to be separated and be removed from the air to be processed. In the reproduction zone, the carbon dioxide absorbed in the processing zone by the holding absorbent is made to be separated to the air for reproduction by ventilating the air for reproduction into the reproduction zone. Thereby, the holding absorbent of the rotor potion is reproduced.

When the holding absorbent is reproduced, since the reproduction carries out by a difference in enthalpy between the air to be flown to the processing zone and the air to be flown to be reproduced, even if the temperature of the air to be flown in the reproduction zone is low, the reproduction can carry out sufficiently. Then, degradation of the absorbent can be suppressed even if the carbon dioxide absorbent of an amine system is used. Also, the control of removal/concentration performance of carbon dioxide can be attained by controlling the enthalpy (both temperature and humidity) of the air to be processed which is ventilated to the processing zone and/or the air to be reproduced which is ventilated to the heat reproduce zone.

If the ventilation of room passes through the processing zone of absorption type removal/concentration device, the carbon dioxide levels of the air at the outlet of the processing zone become low. If the air at the outlet is supplied into the room in the buildings, etc. where the carbon dioxide levels become high, the carbon dioxide levels in the room can be made to become low. In this case, since the amount of open air introduced in order to reduce indoor carbon dioxide levels can be reduced sharply, compared with the usual ventilation, it becomes energy saving. Also, since carbon dioxide levels of the air at the outlet of the reproduction zone, which is passed through the reproduction zone of the absorption type removal/concentration apparatus, become high, if the reproduced exit air is led into a growing room for plants, such as a vinyl house and a plant factory, the plants can grow earlier and the discharge of the carbon dioxide to environment can be suppressed. Using both the air at the outlet of the reproduction zone and the air at the outlet of the processing zone which are processed by the absorption type removal/concentration apparatus, the high-concentration carbon dioxide may be supplied into the vinyl house while removing carbon dioxide in the room. The absorption type removal/concentration device can make it possible to constitute a circulation air-conditioning that, for example, a building is air-conditioned with the air at the outlet of the processing zone and the carbon dioxide indoors generated from humans, etc. is supplied to the vinyl house mounted on the roof of the building to promote growth of a plant.

A combination of the honeycomb rotor which has a capability for absorbing odor material such as a volatile organic compound (it is written as following "VOC") and ammonia and the carbon dioxide absorption type removal/concentration apparatus by ESA can improve a quality of indoor air.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
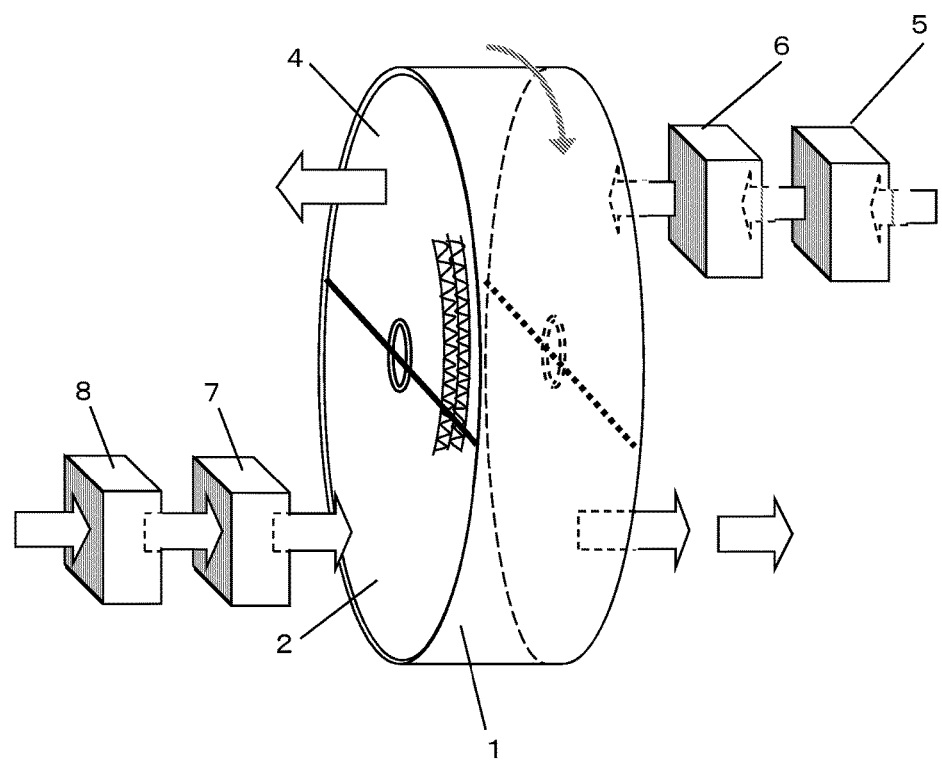
FIG. 1 shows a flow diagram of preferred embodiment 1 of the proposed absorption type removal/concentration apparatus.

Reference will now be made in detail to the embodiments, examples of which are illustrated in the accompanying drawings, wherein like reference numerals refer to the like elements throughout. The embodiments are described below to explain the present invention by referring to the figures.

The proposed device has a rotor holding an amine support solid absorbent with a carbon dioxide absorption function, etc. The rotor is divided into a processing zone and a reproduction zone at least. The proposed device has such a function that the air to be processed is ventilated in the processing zone to separate and remove the carbon dioxide from the air to be processed, and the air to be reproduced is ventilated in the reproduction zone to desorb the carbon dioxide. The proposed device is constructed such that an enthalpy adjustment device is mounted to adjust the enthalpy (both temperature and humidity) of the air to be reproduced ventilated in the reproduction zone and/or the air to be processed ventilated in the processing zone.

A first preferred embodiment of the absorption type removal/separation apparatus is described along with FIG. 1 as follows. 1 denotes a honeycomb rotor, and the rotor is made by corrugated (wave attachment) processing of a nonflammable sheet of ceramic textiles paper, glass fiber paper, etc., and by twisting processing in the shape of a rotor. The rotor supports organic system absorbents such as an amine installation porous material. Specifically, the absorbent can be tri-ethanol amine, mono ethanolamine, etc., weakly basic anion exchange resin of an amine system and amine support solid absorbents such as activated carbon holding amine and meso-porous silica.

The honeycomb rotor 1 is divided into a processing zone 2 and a reproduction zone 4. Indoor air is supplied to the processing zone 2 in a blower (not shown, since it is general), etc.

After carrying out enthalpy adjustment of the air to be processed through a temperature control device 8 and a humidity adjustment device 7, the air to be processed is ventilated into processing zone 2, and the absorbent of the rotor portion is made to absorb the carbon dioxide contained in the air to be processed, the separation and the removal of the carbon dioxide from the air to be processed are carried out, and the concentration of carbon dioxide is reduced in the air to be processed.

Figure 9:
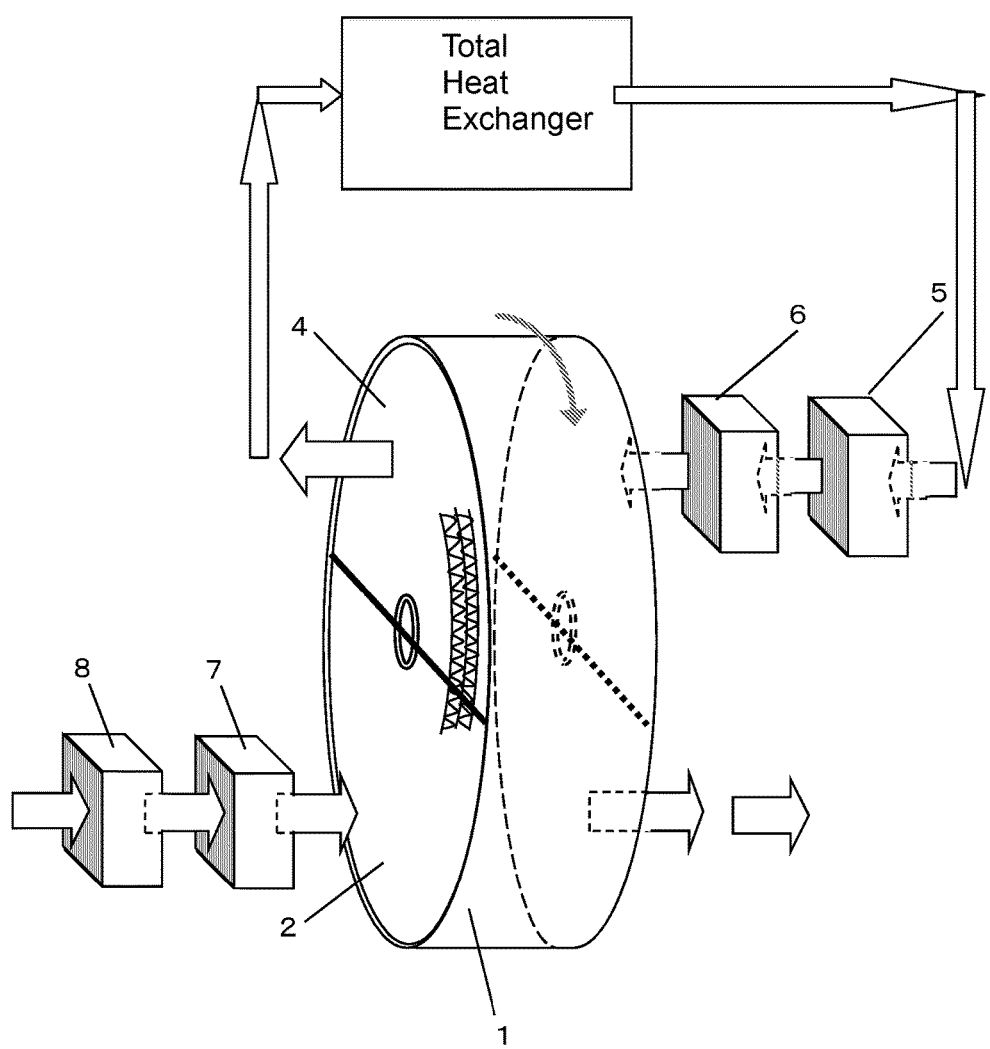
FIG. 9 shows the absorption type removal/concentration apparatus of FIG. 1 with a total heat exchanger.

In the reproduction zone 4, after passing the air to be reproduced heated by a temperature control device 5 through a humidity adjustment device 6 to carry out enthalpy adjustment, the air is ventilated in the reproduction zone 4 to separate and remove the carbon dioxide absorbed in the rotor to the air to be reproduced, and then, the holding absorbent of the rotor portion in a process of passing through the processing zone is reproduced. Also, a total heat exchanger of honeycomb rotor type or standstill type rectangular cross style element type may be provided in the inlet and the outlet of the passage of the air to be reproduced, which are ventilated in the reproduction zone 4, to carry out all the heat recollection. FIG. 9 shows an embodiment of the proposed absorption type removal/separation apparatus, which includes a total heat exchanger.

If the weakly basic anion exchange resin which has especially a primary class amine and/or a second class amine as a functional group is used as a solid absorbent, reactions as shown by the above formula [2a], [2b], [4a] and [4b] occur, and it is thought that the continuation derivative model of an amine carbon dioxide-basin system is formed. That is, the solvent as a continuation dielectric is made into the surroundings of the $HCO_3$-molecule as solute, and electric charge distribution of a solute molecule causes polarization in a surrounding solvent. In the continuation derivative model, since the formulas [2a], [2b], [4a] and [4b] are promoted under low-temperature conditions by such an interaction between solute and solvent, the reactivity such as absorption speed, diffusion speed. etc, becomes high. Therefore, in the continuation derivative model by humidifying at the reproduction temperature of the degree of low temperature, a different behavior shows from a conventional technology of the substitution desorption such that the heated air to be reproduced at a low temperature is made to be in a state of humidification and the material to be removed in a state of adsorption is driven out with moisture from the absorbent. As to the various examinations we have done so far, the acknowledge that the carbon dioxide can hardly be removed and condensed in the honeycomb rotor supporting the amine support solid absorbent which has the third class amine as a functional group is obtained, and it is thought that removal and concentration of carbon dioxide has taken place also from this at the above reactions.

In a case where the inlet of the reproduction zone is not humidified, 50-60° C. or more of reproduction temperature is needed in order to demonstrate the suitable carbon dioxide removal performance as apparatus.

Even if the reproduction temperature is made to be low to about 30-40 after heating the reproduction air at 50-60° C. by carrying out evaporative cooling humidification, carbon dioxide removal performance can be maintained. Thereby, it brings about the advantages that the heat deterioration of an amine support solid absorbent can be reduced and the reinforcement of the honeycomb rotor can be achieved. Also, it becomes possible to suppress the odor emission from the honeycomb rotors by disassembly of amine, etc., such as amine-like odor.

In the preferred embodiment 1, the humidity adjustment devices 6 and 7 and the temperature control devices 5 and 8 as an enthalpy adjustment device are provided in both the processing zone 2 and the reproduction zone 4. This constitution enables to control enthalpy. However, it is not limited to this constitution, and the enthalpy adjustment devices may be provided only in one of the two zones. A placement of the humidity adjustment devices 6 and 7 and the temperature control devices 5 and 8 may be made reverse, and anyone of the humidity and the temperature may be adjusted by the adjustment device. In the case where the conditions of indoor air or the open air are settled in a predetermined range, if the enthalpy of the air sent to the reproduction zone 4 is larger than the air sent to the processing zone 2, the indoor carbon dioxide will be emitted to the open air. Therefore, in this case, the fixed state may be sufficient without adjusting enthalpy.

It is not limited for the air flow of the preferred embodiment 1 to one way, and it may be made to raise the concentration levels of the carbon dioxide further by returning a part or the whole quantity of the air for reproduction which comes out from the reproduction zone 4 on a side of the inlet of the enthalpy adjustment device 5 to carry out reproduction circulation. Also, it may be made to raise the amount of carbon dioxide removal by returning a part or the whole quantity of air which comes out from the processing zone 2 on a side of the inlet of the enthalpy adjustment device 8 to carry out processing circulation. Furthermore, the absorption type removal/separation device which is combined the reproduction circulation described above and the processing circulation is sufficient.

Figure 7:
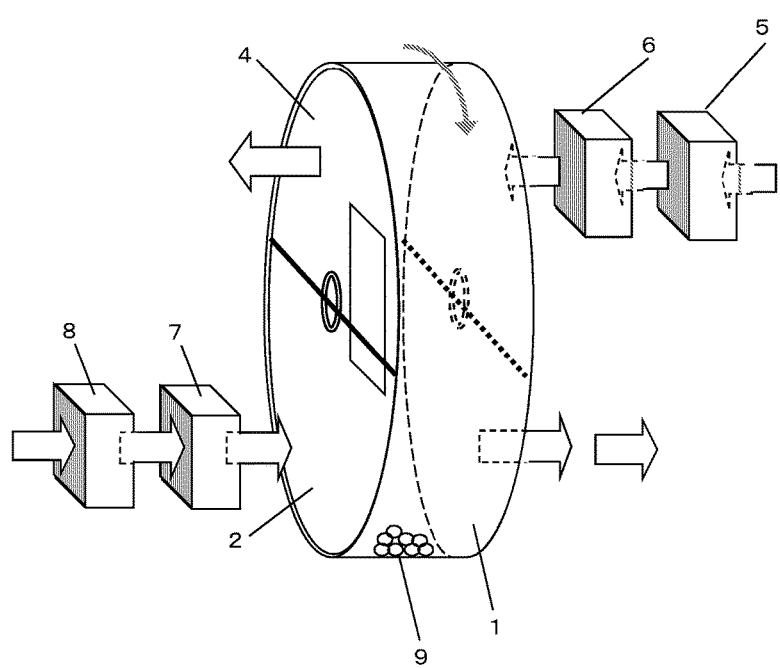
FIG. 7 shows a flow diagram which indicates the rotor using the absorbent of pellet type in the preferred embodiment of the proposed absorption type removal/concentration apparatus.
Figure 8:
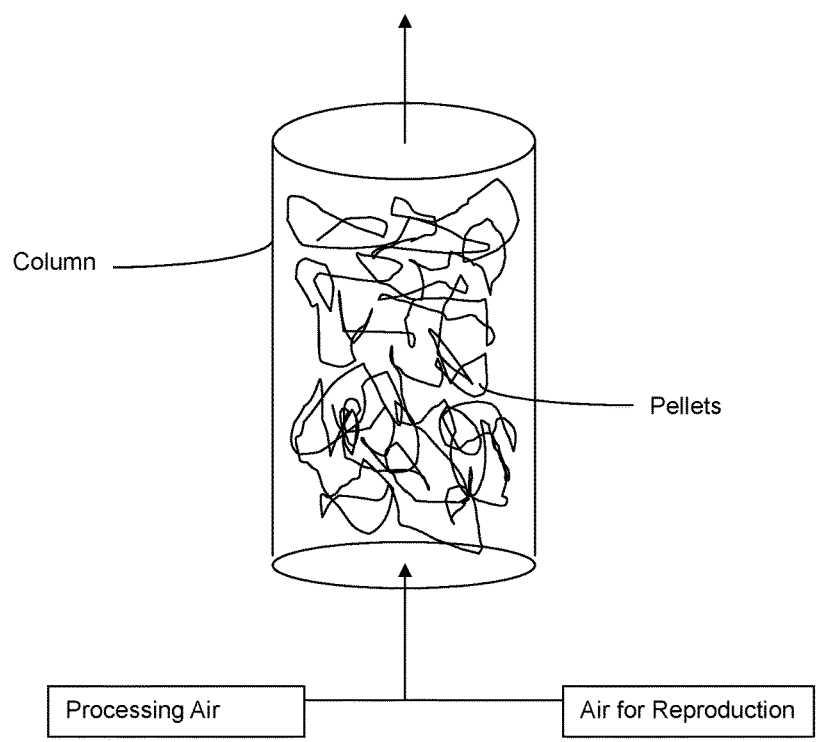
FIG. 8 shows a column/pellet embodiment of the proposed absorption type removal/concentration apparatus.

It is not limited to the honeycomb rotor 1 which is divided into the processing zone 2 and the reproduction zone 4, the processing zone may be divided into two or more zones and the reproduction zone may be divided into two or more zones. Thus, both of the zones may be constructed to be divided into two or more zones. The inventor's proposal is not limited to the honeycomb rotor, instead of the honeycomb rotor as shown in FIG. 7, the rotor which has a net and a pellet type or a granular type amine support solid absorbent 9, etc., may be used. Also, the rotor constructed such that the absorbent is filled in the column such as the shape of a pillar and the shape of a square pillar and the air and the absorbent can contact each other directly may be used. FIG. 9 shows a column/pellet embodiment for the proposed absorption type removal/separation apparatus. Although FIG. 9 shows a co-current flow for the processing air and the air for reproduction, a counter current flow is also possible. Furthermore, it is sufficient also as construction of a batch type which absorbs and desorbs carbon dioxide by turns using at least two or more kinds of rotors which are supported the amine support solid absorbent, etc.

The result of the various experiments conducted by using absorption type removal/separation apparatus of the preferred embodiment 1 is described as follows. As to the honeycomb rotor, the width is 200 mm and the diameter is 200 mm. Also, the rotor supports the amine support solid absorbent. The experiment was conducted under the following conditions. The carbon dioxide levels at the inlet of processing zone is 800 ppm, the surface ratio of the processing zone and the reproduction zone is 1:1, and both of the treated surface wind velocity and the reproduction surface wind velocity are 2 m/s.

Figure 2:
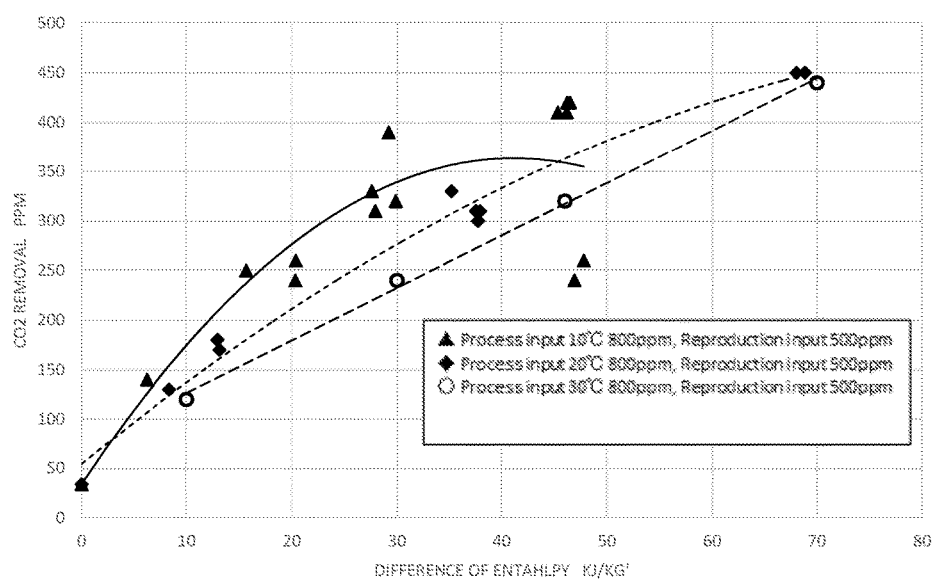
FIG. 2 shows the graph which indicates the amount of carbon dioxide removal to a difference in enthalpy between an inlet of the reproduction zone and an inlet of the processing zone.

FIG. 2 shows the amount of carbon dioxide removal to the difference in enthalpy between the inlet of the reproduction zone and the inlet of the processing zone at the time of changing the temperature of the inlet of the processing zone. The carbon dioxide level of the inlet of the reproduction zone is fixed at 500 ppm. The graph shows the larger the difference in enthalpy between the inlet of the reproduction zone and the inlet of the processing zone is, the larger the amount of carbon dioxide removal is larger. Therefore, it turns out to the followings. Enthalpy control of the apparatus may be carried out so that the enthalpy of the air at the inlet of the processing zone may be made as low as possible and the enthalpy of the air at the inlet of the reproduction zone may be raised as much as possible in order to increase the amount of carbon dioxide removal. As such an example of operation, if air with a reproduction air absolute humidity of 20 g/kg (summer air conditions) is heated at 70° C. by using the exhaust heat of about 90° C. such as the exhaust heat from the carbon dioxide heat pump, warm water from a boiler and exhaust heat from other equipment, etc. and cooled by carrying out evaporative cooling to 45° C. with an evaporation type humidifier, the enthalpy of the air for reproduction will become 128 kJ(s)/kg'. The larger the amount of carbon dioxide removal is, the lower the temperature at the inlet of the processing zone temperature is.

Figure 3:
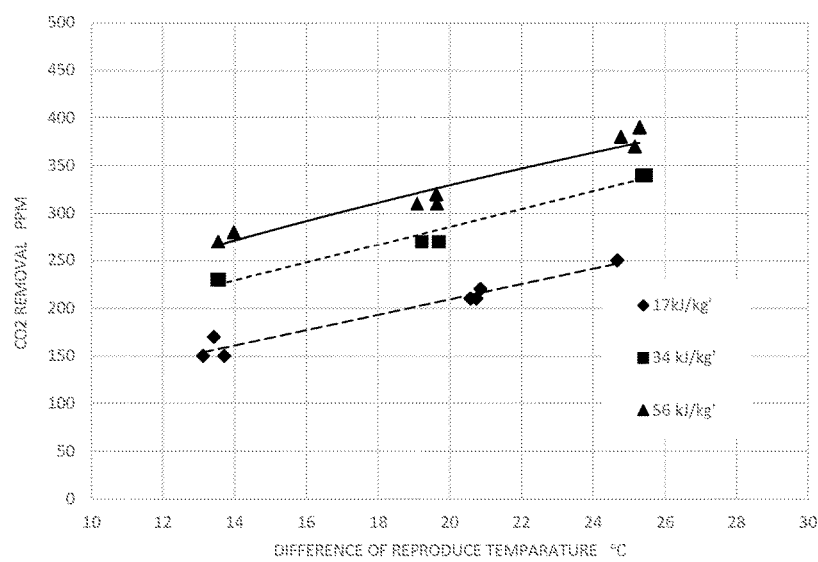
FIG. 3 shows the graph which indicates the amount of carbon dioxide removal to the difference in temperature of the inlet of the reproduction zone and the inlet of the processing zone in a condition that the temperature at the inlet of the processing zone is fixed and the difference in enthalpy between the inlet of the reproduction zone and an inlet of the processing zone is changed.

FIG. 3 shows the amount of carbon dioxide removal to the difference in temperature between the inlet of the reproduction zone and the inlet of the processing zone at the time of changing the difference in enthalpy between the inlet of the reproduction zone and the inlet of the processing zone in the conditions that the temperature of the inlet of the processing zone is made to be constantly at 20° C. and the carbon dioxide levels at the reproduction zone is made to be constantly at 800 ppm. The graph shows the larger the difference in temperature between the inlet of the processing zone and the inlet of the reproduction zone, the larger the amount of carbon dioxide removal is. Then, it turns out that the amount of removal is dependent on the difference in temperature between the inlet of the reproduction zone and the inlet of the processing zone.

Figure 4:
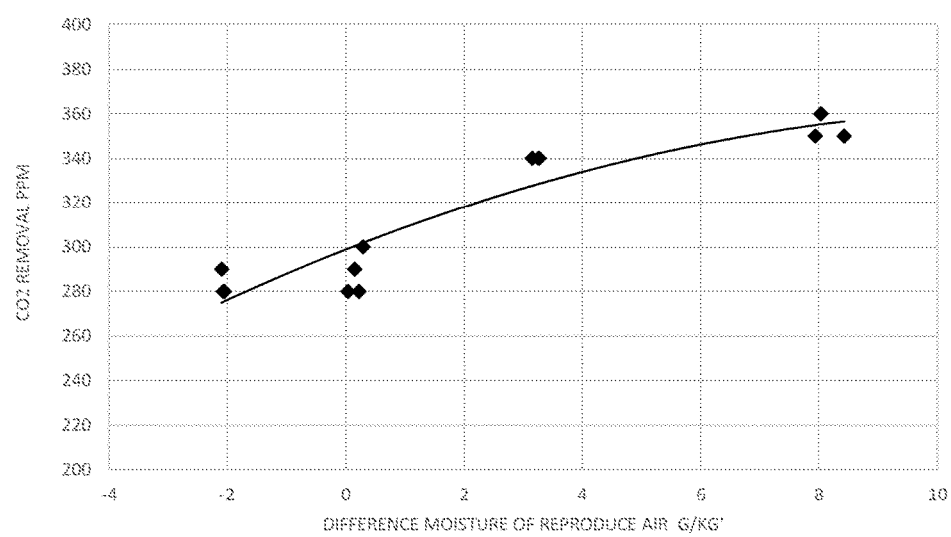
FIG. 4 shows the graph which indicates the amount of carbon dioxide removal to the absolute humidity difference between the inlet of the reproduction zone and the inlet of the processing zone in a condition that the temperature and humidity at the inlet of the processing zone are fixed to be constant.
Figure 5:
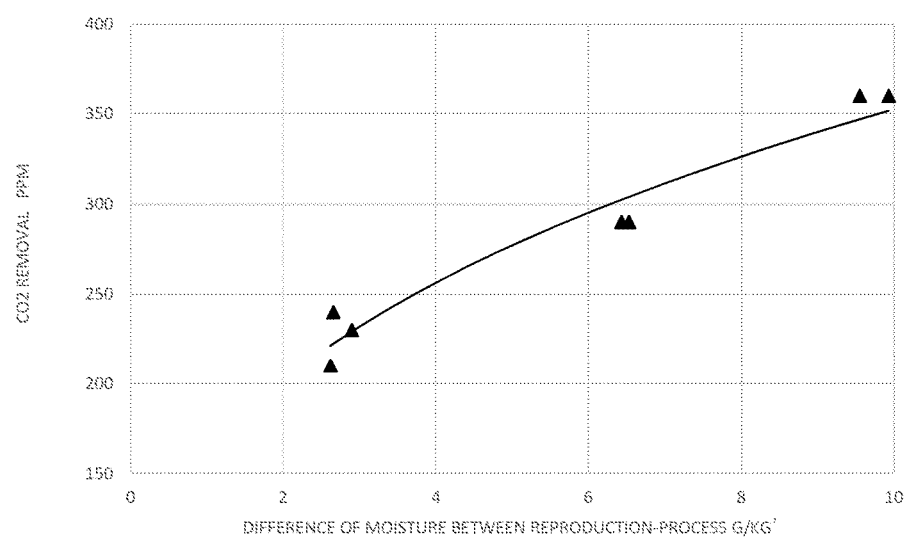
FIG. 5 shows the graph which indicates the amount of carbon dioxide removal to the absolute humidity difference between the inlet of the reproduction zone and the inlet of the processing zone in a condition that the temperature and humidity at the inlet of the reproduction zone are fixed to be constant.

FIG. 4 shows the amount of carbon dioxide removal in a condition that absolute humidity at the inlet of the reproduction zone is changed and in a constant condition that the temperature at the inlet of the processing zone is 20° C., absolute humidity at the inlet of the processing zone is 3.8 g/kg' and carbon dioxide level at the inlet of the reproduction zone is 800 ppm. Also, FIG. 5 shows the amount of carbon dioxide removal in a constant condition that temperature at the inlet of the processing zone is 20° C., absolute humidity at the inlet of the reproduction zone is 17.0 g/kg' and carbon dioxide level at the inlet of the reproduction zone is 800 ppm and in a condition that the absolute humidity at the inlet of the processing zone is changed. These graphs show that the larger the absolute humidity difference between at the inlet of the processing zone and at the inlet of the reproduction zone is, the larger the amount of carbon dioxide removal is larger. It turned out that the amount of carbon dioxide removal increases by lowering the humidity on the side of processing. Therefore, the apparatus may be controlled to lower the enthalpy of air at the inlet of the processing zone as much as possible in order to increase the amount of carbon dioxide removal. In view of FIG. 3 through FIG. 5, it is thought that the enthalpy swing absorption which performs absorption and desorption of an object by an enthalpy difference has occurred with the combination of temperature swing and humidity swing.

Figure 6:
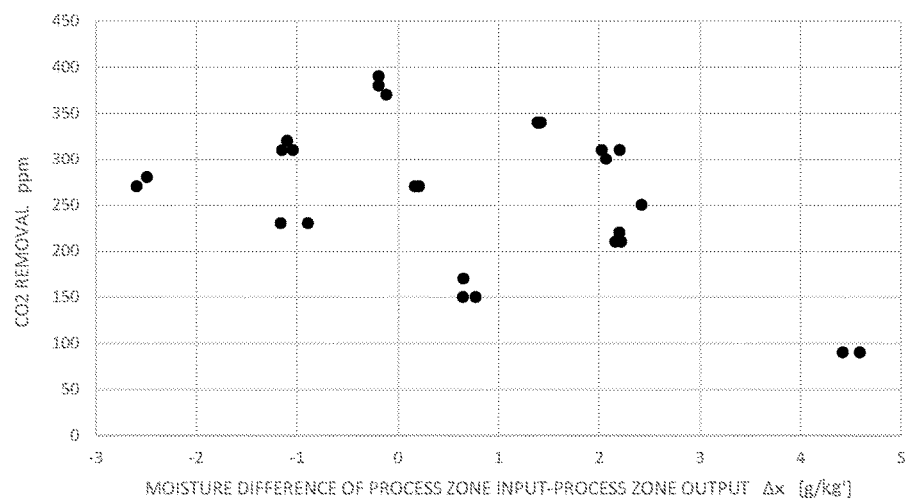
FIG. 6 shows the graph which indicates the amount of carbon dioxide removal to absolute humidity difference Δx between the inlet of the processing zone and the outlet of the processing zone.

FIG. 6 shows the amount of carbon dioxide removal to absolute humidity difference $\Delta x$ between at the inlet of the processing zone and at the outlet of the processing zone. This graph shows that the amount of carbon dioxide removal is not dependent on absolute humidity difference $\Delta x$ between at the inlet of the processing zone and at the outlet of the processing zone. If carbon dioxide is desorbed by substitution desorption as a conventional technology that the high moisture air such as vapor is used as the air for reproduction, the regular tendency should be seen by the carbon dioxide extraction ratio to absolute humidity difference $\Delta x$. However, since such a tendency is not seen, substitution desorption does not arisen.

From the above results, it turned out the followings. As to the absorption type removal/concentration apparatus, which utilizes the principle of enthalpy swing absorption with the honeycomb rotor holding absorbent of carbon dioxide, it is effective for the apparatus to control the enthalpy of the air at the inlet of the processing zone as low as possible and the enthalpy of the air at the inlet of the reproduction zone as much as possible. Especially, in a case that the styrene system gel resin supported primary and secondary amine is used as an absorbent, the price will become cheap as compared with other solid-carbon-dioxide adsorbent. As compared with the removal apparatus using amine solution, its handling becomes easy and its initial cost or its running cost is lower. Although there is a disadvantage that the heat resistance of the styrene system gel resin supported this primary and secondary amine is weak.

However, since reproduction temperature can be made low by using the apparatus using the principle of ESA according to the inventors' proposals, this problem is also solvable.

If weakly basic anion exchange resin and weak acidic cationic exchange resin are mixed and it supports on the honeycomb rotor, acidic gas such as SOx and NOx and alkaline gas such as ammonia are also removable besides carbon dioxide. In addition, it may combine with the rotor using activated carbon, hydrophobic zeolite and a synthetic adsorbent material. In this case, the honeycomb rotor also comes to have a function which can carry out adsorption removal of an indoor bad smell and VOC.

The apparatus utilizes the principle of ESA with the rotor holding the absorbent of carbon dioxide. Since the apparatus absorbs the carbon dioxide contained in the air to be processed in the processing zone and desorbs the carbon dioxide absorbed in the processing zone with the air for reproduction at 30-80° C., the energy is saved, compared with the case where the high temperature air for reproduction is used in the reproduction zone.

Since the carbon dioxide levels of the air at the outlet of the processing zone, which has passed through the processing zone of absorption type removal/concentration device are low, if the air is supplied into the interior of room of the buildings, etc., the carbon dioxide levels of the air in the interior of room can be made low. In this case, since the amount of open air introduced in order to reduce indoor carbon dioxide levels can be reduced sharply, compared with the usual ventilation, it becomes energy saving. Also, since the carbon dioxide levels of the air at the outlet of the reproduction zone, which has passed through the reproduction zone of the absorption type removal/concentration apparatus is high, if the air is led into the growing room for plants such as a vinyl house and a plant factory, the plants grow early and it can control discharge of the carbon dioxide to environment. The high-concentration carbon dioxide in the reproduction zone may be supplied to a vinyl house with the indoor carbon dioxide removed by using both the air in the outlet of the reproduction zone and the air in the outlet of the processing zone. The absorption type removal/concentration apparatus can perform circulation air-conditioning of carbon dioxide. For example, a building is air-conditioned with the air at the outlet of the processing zone, which is removed the carbon dioxide generated from humans, etc. from the indoor air, and the air at the outlet of the reproduction zone which becomes high concentration in the carbon dioxide levels is supplied into the vinyl house provided in the roof of the building, etc., to promote growth of a plant.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An absorption type removal/concentration apparatus comprising:
    an amine support solid absorbent made to:
        contact with air to be processed containing carbon dioxide to make the absorbent absorb carbon dioxide so that carbon dioxide is removed from the air to be processed, and
        contact with air for reproduction to desorb carbon dioxide from the absorbent; and
    at least one enthalpy changing device which decreases an enthalpy of the air to be processed and/or increases the enthalpy of the air for reproduction, wherein
    the at least one enthalpy changing device is controlled to make the enthalpy of the air for reproduction greater than the enthalpy of the air to be processed so as to remove carbon dioxide from the absorbent,
    the at least one enthalpy changing device comprises an enlarging device,
    the enlarging device increases the enthalpy of the air for reproduction, and
    the enlarging device comprises a temperature control device and a humidity control device.

2. The absorption type removal/concentration apparatus according to claim 1, wherein the amine support solid absorbent comprises:
    at least one of a primary class amine and a secondary class amine; and
    a support formed from at least one of a styrene gel resin, activated carbon, and meso-porous silica.

3. The absorption type removal/concentration apparatus according to claim 1, wherein
    the at least one enthalpy changing device comprises a lowering device and an enlarging device,
    the lowering device decreases the enthalpy of the air to be processed and comprises an evaporator of a heat pump, and
    the enlarging device increases the enthalpy of the air for reproduction and comprises a condenser of the heat pump.

4. The absorption removal/concentration apparatus according to claim 3, wherein the enlarging device further comprises a humidifying device to humidify the air for reproduction after the air for reproduction has passed the condenser of heat pump.

5. The absorption removal/concentration apparatus according to claim 4, wherein said humidifying device humidifies using condensed water that was condensed at the evaporator of the heat pump.

6. The absorption removal/concentration apparatus according to claim 1, wherein
    the amine support solid absorbent comprises amine pellets provided in a column,
    the amine support solid absorbent is made to contact the air to be processed by passing the air to be processed through the column, and
    the amine support solid absorbent is made to contact the air for reproduction by passing the air for reproduction through the column.

7. The absorption type removal/concentration apparatus according to claim 1, wherein
    the amine support solid absorbent comprises an amine absorbent supported by a honeycomb rotor, the honeycomb rotor being divided into at least a processing zone and a reproduction zone, and carbon dioxide is removed from the air to be processed by passing the air to be processed through the processing zone and by passing the air for reproduction through the reproduction zone.

8. The absorption removal/concentration apparatus according to claim 1, wherein the amount of carbon dioxide removed from the air to be processed is controlled by controlling an enthalpy difference between the enthalpy of the air for reproduction and the enthalpy of the air to be processed.

9. The absorption removal/concentration apparatus according to claim 7, wherein a portion of air which has passed through the processing zone is recirculated back to an inlet of the processing zone and combined with the air to be processed.

10. The absorption removal/concentration apparatus according to claim 7, wherein a portion of air which has passed through the reproduction zone is recirculated back to an inlet of the reproduction zone and combined with the air for reproduction.

11. The absorption removal/concentration apparatus according claim 7, further comprising:
a total heat exchanger provided between an inlet and an outlet of the reproduction zone to recover heat and humidity from an outlet of the reproduction zone, for supply to an inlet of the reproduction zone.

12. The absorption removal/concentration apparatus according to claim 7, wherein in addition to removing carbon dioxide from the air to be processed, the honeycomb rotor is constituted for at least one of humidity adsorption, humidity absorption, acidic gas adsorption, acidic gas absorption, alkaline gas adsorption and volatile organic compound (VOC) adsorption.

13. The absorption removal/concentration apparatus according to claim 1, wherein
the at least one enthalpy changing device comprises a lowering device and an enlarging device,
the lowering device decreases the enthalpy of the air to be processed, and
the enlarging device increases the enthalpy of the air for reproduction.

14. An absorption removal/concentration apparatus comprising:
an amine support solid absorbent made to:
contact with air to be processed containing carbon dioxide to make the absorbent absorb carbon dioxide so that carbon dioxide is removed from the air to be processed, and
contact with air for reproduction to desorb carbon dioxide from the absorbent; and
at least one enthalpy changing device which decreases an enthalpy of the air to be processed and/or increases the enthalpy of the air for reproduction, wherein
the at least one enthalpy changing device is controlled to make the enthalpy of the air for reproduction greater than the enthalpy of the air to be processed so as to remove carbon dioxide from the absorbent,
the at least one enthalpy changing device comprises a lowering device and an enlarging device,
the lowering device decreases the enthalpy of the air to be processed,
the enlarging device increases the enthalpy of the air for reproduction,
the lowering device comprises a temperature control device and a humidity control device, and
the enlarging device comprises a temperature control device and a humidity control device.

15. The absorption removal/concentration apparatus comprising:
an amine support solid absorbent made to:
contact with air to be processed containing carbon dioxide to make the absorbent absorb carbon dioxide so that carbon dioxide is removed from the air to be processed, and
contact with air for reproduction to desorb carbon dioxide from the absorbent; and
at least one enthalpy changing device which decreases an enthalpy of the air to be processed and/or increases the enthalpy of the air for reproduction, wherein
the at least one enthalpy changing device is controlled to make the enthalpy of the air for reproduction greater than the enthalpy of the air to be processed so as to remove carbon dioxide from the absorbent,
the at least one enthalpy changing device comprises a lowering device,
the lowering device decreases the enthalpy of the air to be processed, and
the lowering device comprises a temperature control device and a humidity control device.

16. The absorption removal/concentration apparatus according to claim 14, wherein a portion of air which has passed through the processing zone is recirculated back to an inlet of the processing zone and combined with the air to be processed.

17. The absorption removal/concentration apparatus according to claim 14, wherein a portion of air which has passed through the reproduction zone is recirculated back to an inlet of the reproduction zone and combined with the air for reproduction.

18. The absorption removal/concentration apparatus according to claim 15, wherein a portion of air which has passed through the processing zone is recirculated back to an inlet of the processing zone and combined with the air to be processed.

19. The absorption removal/concentration apparatus according to claim 15, wherein a portion of air which has passed through the reproduction zone is recirculated back to an inlet of the reproduction zone and combined with the air for reproduction.

* * * * *

UNITED STATES PATENT AND TRADEMARK OFFICE
CERTIFICATE OF CORRECTION

PATENT NO. : 10,201,776 B2
APPLICATION NO. : 15/446265
DATED : February 12, 2019
INVENTOR(S) : Ayako Kuroda et al.

It is certified that error appears in the above-identified patent and that said Letters Patent is hereby corrected as shown below:

In the Claims

In Claim 1, Column 10, Line 4:
After "absorption" delete "type".

In Claim 2, Column 10, Line 26:
After "absorption" delete "type".

In Claim 3, Column 10, Line 33:
After "absorption" delete "type".

In Claim 7, Column 10, Line 62:
After "absorption" delete "type".

Signed and Sealed this
Thirtieth Day of April, 2019

Andrei Iancu
*Director of the United States Patent and Trademark Office*